May 21, 1940.  L. T. MART  2,201,834
COOLING TOWER CONDENSER
Filed July 25, 1938   2 Sheets-Sheet 1

Inventor
Leon T. Mart
By Thorpe & Thorpe
Attorneys

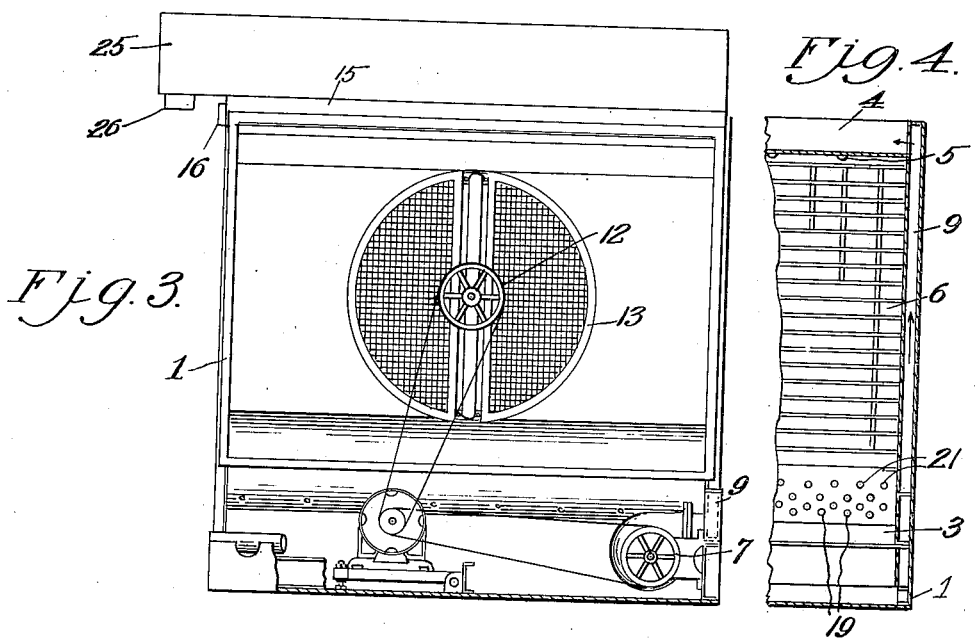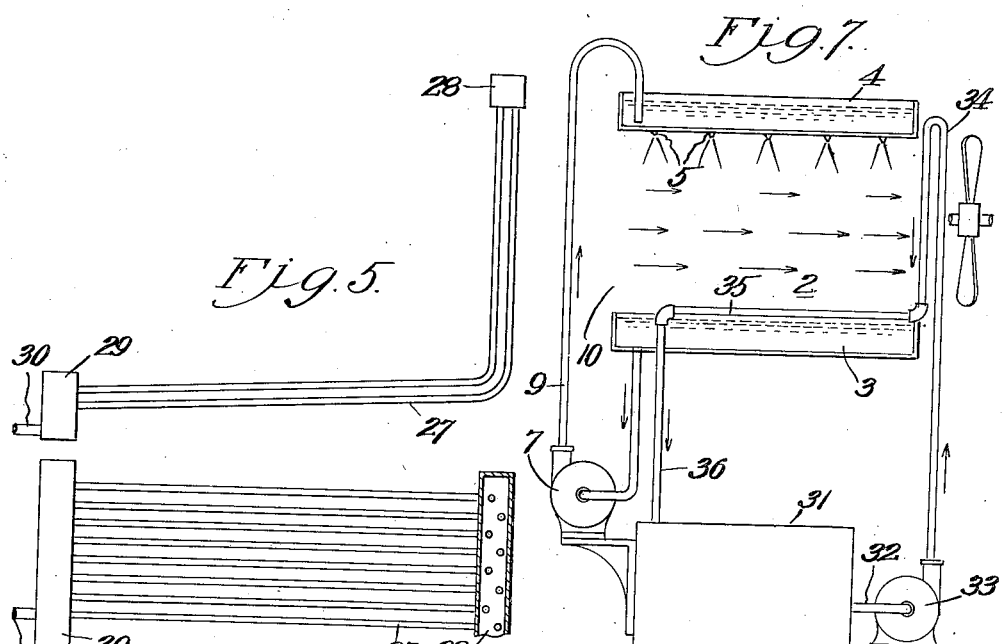

Patented May 21, 1940

2,201,834

UNITED STATES PATENT OFFICE 2,201,834

COOLING TOWER CONDENSER

Leon T. Mart, Johnson County, Kans., assignor to The Marley Company, Kansas City, Kans., a corporation of Missouri Application July 25, 1938, Serial No. 221,125

2 Claims. (Cl. 257—37)

This invention relates to cooling tower condensers and has for its general object to produce a unit which may be of small size for passage through door openings and the like for use in combination with room cooling equipment, or for cooling and condensing any other liquids or gases, the general object of the invention being to provide means for the cooling of water by the evaporative effect of an air stream passing through the water falling in a finely divided form, and utilizing the cooled water to cool one leg of a condenser or cooling coil; while the air, which has picked up heat from the water, before it is permitted to escape from the apparatus, passes through a second coil forming a pre-cooling coil connected to the water cooled coil first-mentioned. By such means the air is forced to perform double duty as it first removes heat from the falling water and then has an evaporative-condenser effect on the coil in the air stream.

Another object of the invention is to produce a construction in which the cooling chamber is provided with a unit assembly splash deck, in combination with both air and water cooled tubes, whereby the deck assembly can be readily removed to expose the tubes for the cleaning of scale or incrusted deposits.

A further object of the invention is to provide in combination with a source of hot fluid supply to be cooled, means for pre-cooling the fluid by contact with an air stream which has been used to cool a water supply, and the using the water thus cooled by contact with the air stream for the further cooling of the fluid in a cooler or second set of coils connected to the pre-cooling coils.

With the general objects named in view and others as will hereinafter appear, the invention consists in certain novel and useful features of construction and organizations of parts as hereinafter described and claimed; and in order that it may be fully understood, reference is to be had to the accompanying drawings, in which—

Figure 3 is an elevation of the air outlet end of the apparatus

Figure 4 is a section on the line IV—IV of Figure 2.

Figure 5 is a side elevation of a modified bank of cooling tubes for use where gas is to be condensed.

Figure 6 is a plan view, partly in section, of the tube assembly shown in Figure 5.

Figure 7 is a diagrammatic view of a complete installation embodying the invention.

Figure 1:
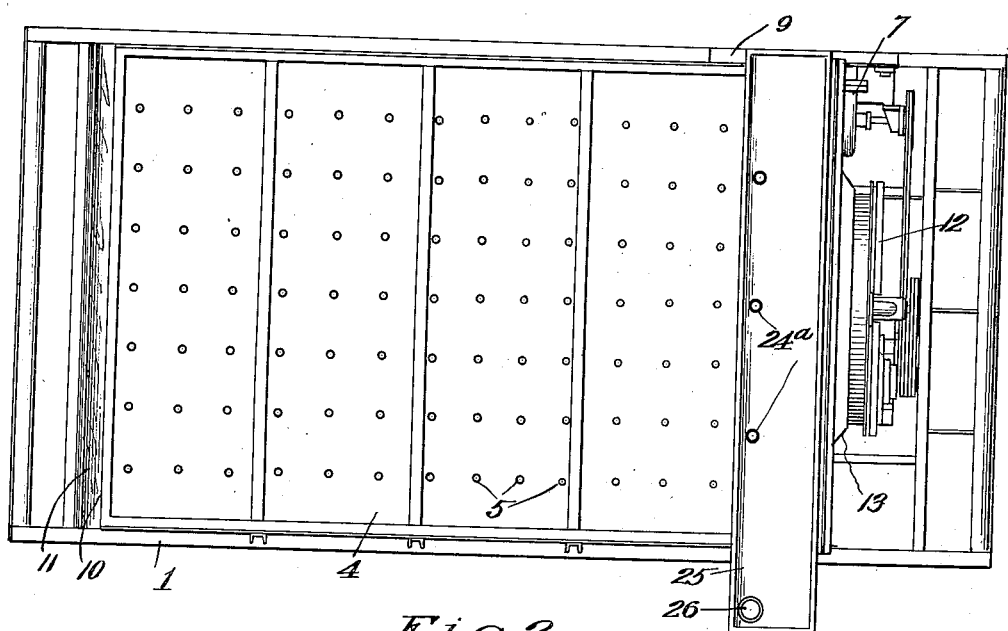
Figure 1 is a top plan view of a cooling tower condenser embodying the invention.
Figure 2:
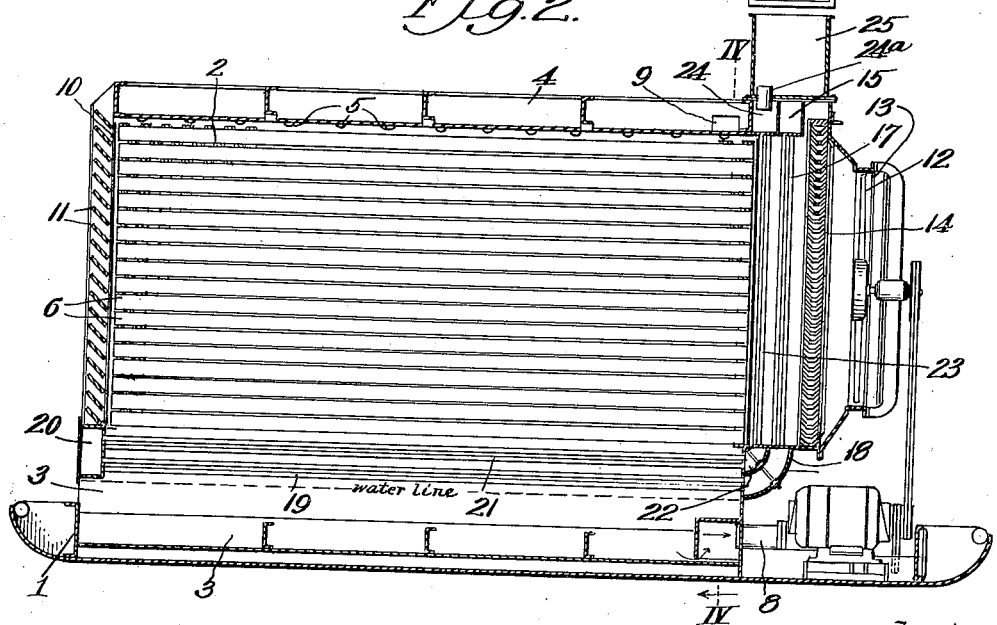
Figure 2 is a vertical section through the same.

In the drawings, where like reference characters identify corresponding parts in all of the figures, 1 is a casing of generally rectangular shape and of relatively extensive lengths as compared with its width, one end of said casing providing a cooling chamber 2, having a collecting basin 3 at its bottom. Overlying the cooling chamber is a distributing basin or means 4 provided with any suitable apparatus for distributing the water in the cooling chamber, such as by means of nozzles 5. In the preferred embodiment of the invention, the cooling chamber or tower is provided with a series of vertically spaced splash decks 6 which may be readily assembled and inserted in or removed from position as needed for the cleaning or repair of certain cooling tubes or coils hereinafter mentioned.

To avoid waste of cooling water, it is preferred that the water be repeatedly recirculated through the tower. Recirculation may be maintained by a pump 7 having connections 8 and 9 respectively, with the collecting basin 3 and with the distributing basin 4; said pump, while the device is in operation, lifting the water from the former and delivering it to the latter for gravitating downwardly in finely divided form through the cooling chamber.

For effective operation, means must be provided to force a stream of air through the water falling in the cooling chamber, and although a force fan might be employed or other means adopted, it has been found preferable to provide one end of the cooling chamber with an air inlet opening 10, which may be protected by a removable louvered plate 11. An exhaust fan 12 is mounted in the other end of the casing to pull the air through the cooling chamber and discharge it through a discharge opening 13. The exhaust fan is preferred to the force fan, since the former interferes to a lesser extent with the even distribution of air and water in the tower, that is there is less tendency for the water to drift as the air flow is more evenly distributed. Just in front of the exhaust fan a water eliminator 14 may be introduced.

In order to utilize the cooling effect of the water and air passing through the cooling tower to the greatest possible extent, where the apparatus is adapted for the cooling of a liquid, the following arrangement of cooling coils may be employed: 15 is a header to which a hot liquid supply line 16 connects. The hot liquid delivered through the line 16 may originate from any type of apparatus Connected to the bottom of the header 15 is a bank or series of tubes 17 constituting a pre-cooling coil extending substantially at right angles through the stream of air flowing through the apparatus, and being positioned just in front of the water eliminator so that said tubes are cooled by the evaporative-condenser effect of the moisture laden air stream.

The lower ends of the tubes 17 are connected to a U-bend 18. A plurality of tubes 19, constituting a cooler, extend from the opposite ends of the members 18 through the cooling chamber at substantially right angles to the falling water in said chamber, the ends of said tubes terminating in a return-header 20. From the return header a second set of tubes 21 leads to a bend 22, and from said bend, tubes 23 extend through the air stream to a terminal header 24. The terminal header 24 has an outflow passage 24a connected to a storage tank 25 from which the cooled liquid may be withdrawn through a pipe 26 as required for use.

Where the apparatus of the invention is intended to condense a refrigerating gas, the gas being delivered in hot gaseous form, the condenser or tubes may be in the shape of a bank of L-shaped tubes 27 as shown in Figure 5, their upper or vertical legs forming the pre-cooler and being connected to a receiving header 28, and their lower or horizontal legs forming the cooler and being connected to a terminal header 29, having a connection 30 through which the condensate may be returned to the point of use. In this construction, it will be apparent that as the gas enters the air cooled pre-cooler tubes, it will start to condense, and before it has reached the ends of the horizontal legs, forming the cooler, it will be condensed to its liquid state.

Figure 7 illustrates the application of the invention in combination with industrial equipment, such as some sort of a heat exchange apparatus 31, a boiler, refrigerator, or the like. The hot fluid from 31 flows through an outlet pipe 32 and is elevated by a pump or pressure means 33 to the pre-cooler tubes 34, and thence through the cooler tubes 35. The cooled fluid is then returned by pipe 36 to the equipment 31 for another cycle of operations as will be readily understood.

From the above description, it will be apparent that I have produced a construction embodying the invention, and it is to be understood that I reserve the right to all changes which may be made within the spirit of the invention and without the ambit of the prior art.

I claim:

1. In a cooling tower condenser, the combination of a water collecting basin, a water distributing basin vertically spaced above said water collecting basin and having a plurality of bottom openings for gravitative discharge of the water therein, a pair of side walls connecting said basins at opposite sides, said walls in conjunction with the basins forming a horizontal air conduit, a fan at one end of the conduit for forcibly propelling air therethrough for evaporative cooling of the falling water, a pump for returning water from the collecting basin to the distributing basin, a condenser in the air stream after the air stream has contacted the falling water, and a second condenser connected to the first condenser, said second condenser being spaced above the water level in the collecting basin and being wetted by the water falling into said basin.

2. In a cooling tower condenser, the combination of a water collecting basin, a water distributing basin vertically spaced above said water collecting basin and having a plurality of bottom openings for gravitative discharge of the water therein, a pair of side walls connecting said basins at opposite sides, said walls in conjunction with the basins forming a horizontal air conduit, a fan at one end of the conduit for forcibly propelling air therethrough for evaporative cooling of the falling water, a pump for returning water from the collecting basin to the distributing basin, a condenser in the air stream after the air stream has contacted the falling water, a second condenser connected to the first condenser, said second condenser being spaced above the water level in the collecting basin and being wetted by the water falling into said basin, and a plurality of vertically spaced splash decks in the air conduit between the collecting and distributing basins.

LEON T. MART.